(12) United States Patent
Xu et al.

(10) Patent No.: US 12,706,338 B2
(45) Date of Patent: Aug. 11, 2026

(54) TOP COVER ASSEMBLY OF CELL, CELL, AND POWER BATTERY

(71) Applicant: Hithium Tech HK Limited, HongKong (CN)

(72) Inventors: Weidong Xu, Xiamen (CN); Qiqi Huo, Xiamen (CN); Nan Zhang, Xiamen (CN); Ziqi Yi, Xiamen (CN); Zuyu Wu, Xiamen (CN)

(73) Assignee: Hithium Tech HK Limited, Hongkong (CN)

( * ) Notice: Subject to any disclaimer, the term of this patent is extended or adjusted under 35 U.S.C. 154(b) by 639 days.

(21) Appl. No.: 17/887,485

(22) Filed: Aug. 14, 2022

(65) Prior Publication Data

US 2023/0055727 A1 Feb. 23, 2023

(30) Foreign Application Priority Data

Aug. 17, 2021 (CN) ......................... 202121932429.6

(51) Int. Cl.
*H01M 50/152* (2021.01)
*H01M 10/04* (2006.01)
(Continued)

(52) U.S. Cl.
CPC ..... *H01M 50/152* (2021.01); *H01M 10/0431* (2013.01); *H01M 50/107* (2021.01);
(Continued)

(58) Field of Classification Search
CPC ............. H01M 50/152; H01M 50/107; H01M 50/186; H01M 50/559; H01M 50/198;
(Continued)

(56) References Cited

U.S. PATENT DOCUMENTS 3,867,201 A * 2/1975 Holmes .................. H01M 6/32 429/185
2011/0200870 A1 * 8/2011 Kim .................... H01M 50/567 429/179
(Continued)

FOREIGN PATENT DOCUMENTS

KR 20170037574 A * 4/2017

OTHER PUBLICATIONS

English Machine Translation of Groshert et al. (KR 20170037574 A) (Year: 2017).*

*Primary Examiner* — Brian R Ohara
*Assistant Examiner* — Emily Elizabeth Freeman

(57) ABSTRACT

Provided are a top cover assembly of a cell, a cell, and a power battery. The top cover assembly includes an insulation cover plate, a metallic support plate, a terminal assembly, and an elastic seal. The metallic support plate and the insulation cover plate are stacked in a thickness direction. The terminal assembly passes through the insulation cover plate and the metallic support plate in the thickness direction to connect the insulation cover plate and the metallic support plate. The elastic seal surrounds a peripheral outside of the metallic support plate and the insulation cover plate. The elastic seal has a positioning flange provided on an inner peripheral surface thereof and is configured to be in a sealing fit with a housing of the cell. The positioning flange is sandwiched between the metallic support plate and the insulation cover plate.

14 Claims, 3 Drawing Sheets

(51) Int. Cl.

| | |
|---|---|
| ***H01M 50/107*** | (2021.01) |
| ***H01M 50/159*** | (2021.01) |
| ***H01M 50/179*** | (2021.01) |
| ***H01M 50/184*** | (2021.01) |
| ***H01M 50/186*** | (2021.01) |
| ***H01M 50/198*** | (2021.01) |
| ***H01M 50/213*** | (2021.01) |
| ***H01M 50/325*** | (2021.01) |
| ***H01M 50/559*** | (2021.01) |
| ***H01M 50/588*** | (2021.01) |
| ***H01M 50/593*** | (2021.01) |
| ***H01M 50/627*** | (2021.01) |

(52) U.S. Cl.

CPC ....... *H01M 50/159* (2021.01); *H01M 50/179* (2021.01); *H01M 50/184* (2021.01); *H01M 50/186* (2021.01); *H01M 50/198* (2021.01); *H01M 50/213* (2021.01); *H01M 50/325* (2021.01); *H01M 50/559* (2021.01); *H01M 50/588* (2021.01); *H01M 50/593* (2021.01); *H01M 50/627* (2021.01)

(58) Field of Classification Search

CPC ............. H01M 50/184; H01M 50/179; H01M 50/213; H01M 50/627; H01M 50/159; H01M 50/588; H01M 50/325; H01M 50/593; H01M 10/0431

See application file for complete search history.

(56) References Cited

U.S. PATENT DOCUMENTS

| | | | | |
|---|---|---|---|---|
| 2015/0270551 | A1* | 9/2015 | Nishi | H01M 4/13 429/188 |
| 2018/0159095 | A1* | 6/2018 | Xing | H01M 50/15 |
| 2019/0027717 | A1* | 1/2019 | Chen | H01M 50/147 |
| 2020/0251711 | A1* | 8/2020 | Wakimoto | H01M 50/176 |
| 2020/0358048 | A1* | 11/2020 | Kim | C25D 11/04 |

* cited by examiner

TOP COVER ASSEMBLY OF CELL, CELL, AND POWER BATTERY

CROSS-REFERENCE TO RELATED APPLICATIONS

The present application is based on and claims priority to Chinese Patent Application No. 202121932429.6, filed on Aug. 17, 2021, the entire content of which is incorporated herein by reference.

TECHNICAL FIELD

The present disclosure relates to the field of battery technologies, and more particularly, to a top cover assembly of a cell, a cell, and a power battery.

BACKGROUND

In the related art, an insulation cover plate or a metallic cover plate may be fabricated through one-piece molding technology and directly assembled with a housing; and a pressing portion is usually formed on an outer peripheral surface of the housing through a roller pressing process. However, due to a restriction of precision of the rolling pressing process and an operator, it is difficult to ensure sealing performance between the insulation cover plate and the housing, and to avoid a relative rotation from being generated between the insulation cover plate and the housing, which would affect a normal use of the cell. In addition, since a fixed connection between the insulation cover plate and the housing is not stable enough, and a strength of the insulation cover plate is insufficient, damages are likely to occur during mounting.

SUMMARY

The present disclosure aims at solving at least one of the technical problems in the related art. To this end, embodiments of the present disclosure provide a top cover assembly of a cell, a cell, and a power battery, which can be capable of shortening a length of the top cover assembly in an axial direction to increase a capacity of the cell, thereby improving a charging-discharging capability of the power battery.

A top cover assembly of a cell according to embodiments of the present disclosure includes an insulation cover plate, a metallic support plate, a terminal assembly, and an elastic seal. The metallic support plate and the insulation cover plate are stacked in a thickness direction. The terminal assembly passes through the insulation cover plate and the metallic support plate in the thickness direction to connect the insulation cover plate and the metallic support plate. The elastic seal surrounds a peripheral outside of the insulation cover plate and the metallic support plate. The elastic seal has a positioning flange provided on an inner peripheral surface thereof, and the positioning flange is sandwiched between the metallic support plate and the insulation cover plate. The elastic seal is configured to be in a sealing fit with a housing of the cell.

With the top cover assembly according to embodiments of the present disclosure, the metallic support plate is in contact with the insulation cover plate in the thickness direction to shorten a length of the top cover assembly in the thickness direction and enlarge a space between the top cover assembly and the housing, thereby increasing a capacity of the cell. In addition, the ring-shaped positioning flange can support the metallic support plate and limit a position of the insulation cover plate in the thickness direction, thereby improving sealing performance of the top cover assembly. Thus, it is possible to prevent normal use of the top cover assembly from being affected due to an elastic deformation caused by mutual compression between the insulation cover plate and the metallic support plate.

In some embodiments, the elastic seal has a sleeve-like shape and includes a first sealing sleeve and a second sealing sleeve that are disposed at both sides of the positioning flange, respectively. The first sealing sleeve has an inner peripheral surface located outside of an inner peripheral surface of the second sealing sleeve. The metallic support plate is located within a space defined by the first sealing sleeve and the positioning flange. The insulation cover plate is located within a space defined by the second sealing sleeve and the positioning flange.

In some embodiments, the second sealing sleeve is formed as a pre-pressed region configured to withstand a force from a protrusion structure on a side wall of the housing of the cell.

In some embodiments, the inner peripheral surface of the first sealing sleeve is adapted to the metallic support plate. A reserved gap is defined between the inner peripheral surface of the second sealing sleeve and an outer peripheral surface of the insulation cover plate.

In some embodiments, outer peripheral surface of the insulation cover plate is gradually inwardly inclined away from the elastic seal in an axial direction away from the metallic support plate.

In some embodiments, the second sealing sleeve has a wall thickness equal to 1.2 times to 2 times a wall thickness of the first sealing sleeve.

In some embodiments, the terminal assembly includes a terminal passing through the insulation cover plate and the metallic support plate, and a terminal fixation member connected to the terminal at a side of the metallic support plate away from the insulation cover plate. The top cover assembly also includes an insulation gasket interposed between the terminal fixation member and one surface of the metallic support plate.

In some embodiments, the insulation gasket includes an insertion protrusion sandwiched between an outer peripheral surface of the terminal and a through hole of the metallic support plate.

In some embodiments, the top cover assembly of the cell also includes an insulation pad disposed around the terminal. The terminal includes a stop flange abutting against the insulation cover plate. The insulation pad is pressed between another surface of the metallic support plate and the stop flange of the terminal.

In some embodiments, the other surface of the metallic support plate has a first recess and a second recess located at a bottom of the first recess. The insulation cover plate has a boss inserted into the first recess. A part of the insulation pad protruding beyond the boss is fitted with the second recess.

In some embodiments, the metallic support plate has a liquid injection hole corresponding to a liquid injection hole of the insulation cover plate, and the insulation cover plate has a through hole in communication with a through hole of the metallic support plate. An explosion proof-valve for closing the through hole of the metallic support plate is disposed in the through hole of the metallic support plate.

A cell according to embodiments of the present disclosure includes a housing, a jelly roll, and the top cover assembly according to any of the above embodiments. The housing is open at one end thereof to form an assembling port. The jelly roll is disposed within the housing. The top cover assembly is mounted at the assembling port of the housing. A side wall of the housing has a protrusion structure protruding inwardly and configured to press an outer peripheral surface of the elastic seal in a radial direction. The elastic seal has a protrusion protruding beyond the metallic support plate. A top of the housing abuts against the protrusion of the elastic sealing member.

In some embodiments, the top of the housing has a folded edge configured to press and wrap the protrusion, and the protrusion is partially pressed against an end surface of the metallic support plate.

A power battery according to embodiments of the present disclosure includes a plurality of cells, and each of the plurality of cells is the cell according to any of the above embodiments. The plurality of cells is electrically connected to each other to form a charge-discharge circuit.

Additional aspects and advantages of the present disclosure will be set forth at least in part in the following description, or will become apparent at least in part from the following description, or can be learned from practicing of the present disclosure.

BRIEF DESCRIPTION OF DRAWINGS

The above and/or additional aspects and advantages of the present disclosure will become more apparent and more understandable from the following description of embodiments taken in conjunction with the accompanying drawings, in which.

Figure 1:
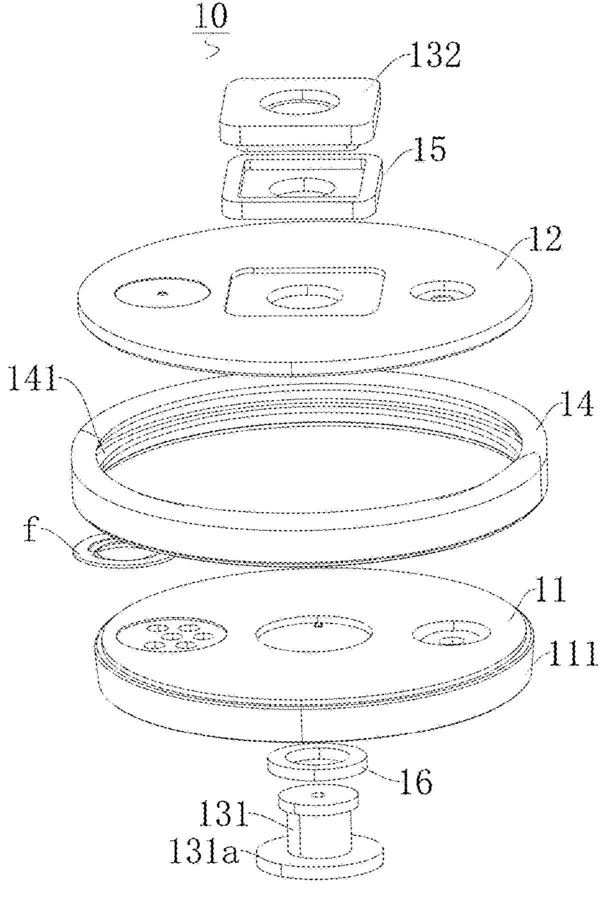
FIG. 1 is a schematic exploded perspective view showing a top cover assembly according to an embodiment of the present disclosure.

REFERENCE SIGNS cell 100;

top cover assembly 10; insulation cover plate 11; inwardly inclined surface 111; boss 112; metallic support plate 12; first recess 121; second recess 122: terminal assembly 13; terminal 131; stop flange 131*a*; terminal fixation member 132; elastic seal 14; positioning flange 141; first sealing sleeve 142; second sealing sleeve 143; protrusion 144; folded edge 144*a*; insulation gasket 15; insertion protrusion 151; insulation pad 16: pre-pressed region n; reserved gap m; liquid injection hole k; through hole h; explosion-proof valve f;

housing 20; assembling port 21; protrusion structure 22; winding core 30;

predetermined direction A.

DESCRIPTION OF EMBODIMENTS

Embodiments of the present disclosure will be described in detail below with reference to the accompanying drawings and are exemplary. A top cover assembly 10 of a cell 100, the cell 100, and a power battery according to embodiments of the present disclosure will be described below with reference to FIG. 1 to FIG. 5.

To satisfy different power requirements for use, a battery may include a plurality of battery units, each of which may also be called the cell 100. Here, a plurality of cells 100 may be in a series connection, in a parallel connection, or in a series-parallel hybrid connection. The series-parallel hybrid connection refers to a combination of the series connection and the parallel connection. That is, the plurality of cells 100 may be directly disposed within a battery casing to form a battery. Of course, the cell 100, which is not limited to being assembled into the battery, may also be used as an independent charge-discharge element.

The cell 100 includes a housing 20 and a cell body (e.g., a jelly roll 30, or a laminated structure formed by laminating a positive electrode plate and a negative electrode plate) disposed inside the housing 20. For a square cell 100, the housing 20 is in a rectangular shape. For a cylindrical cell 100, the housing 20 of the cell 100 may be in a cylindrical shape. The housing 20 has an internal space to accommodate the cell body and an electrolyte and an assembling port 21 in communication with the internal space. The jelly roll 30 may be fitted into the housing 20 from the assembling port 21. The housing 20 may be made of a material such as aluminum, aluminum alloy, plastic, o the like.

Figure 3:
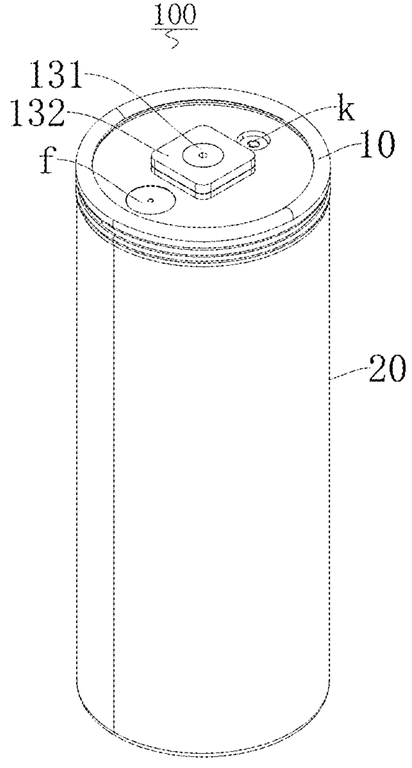
FIG. 3 is a schematic view showing a cell according to an embodiment of the present disclosure.
Figure 4:
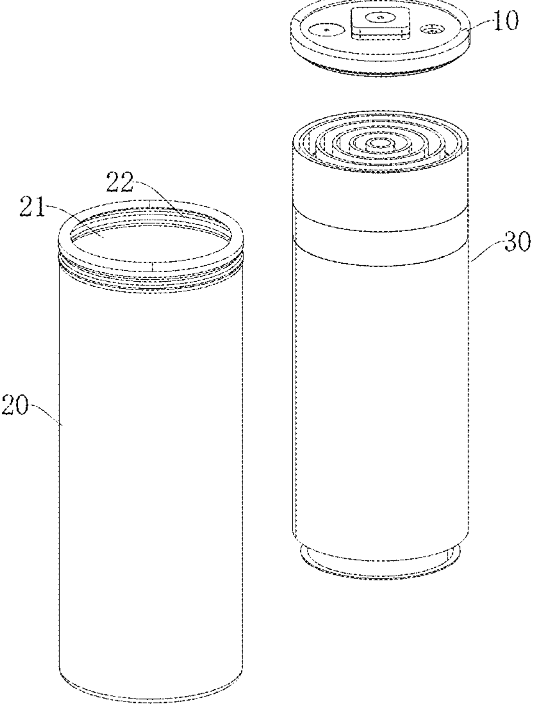
FIG. 4 is a schematic exploded perspective view showing a cell according to an embodiment of the present disclosure.

The top cover assembly 10, which may also be referred to as the top cover assembly 10, is configured to seal the assembling port 21 of the housing 20. For the cylindrical cell 100 as illustrated in FIG. 3, the top cover assembly 10 has a disc shape. For a square cell 100, accordingly, the top cover assembly 10 has a substantially square shape.

The top cover assembly 10 of the cell 100 according to some embodiments of the present disclosure includes an insulation cover plate 11, a metallic support plate 12, a terminal assembly 13, and an elastic seal 14.

Figure 5:
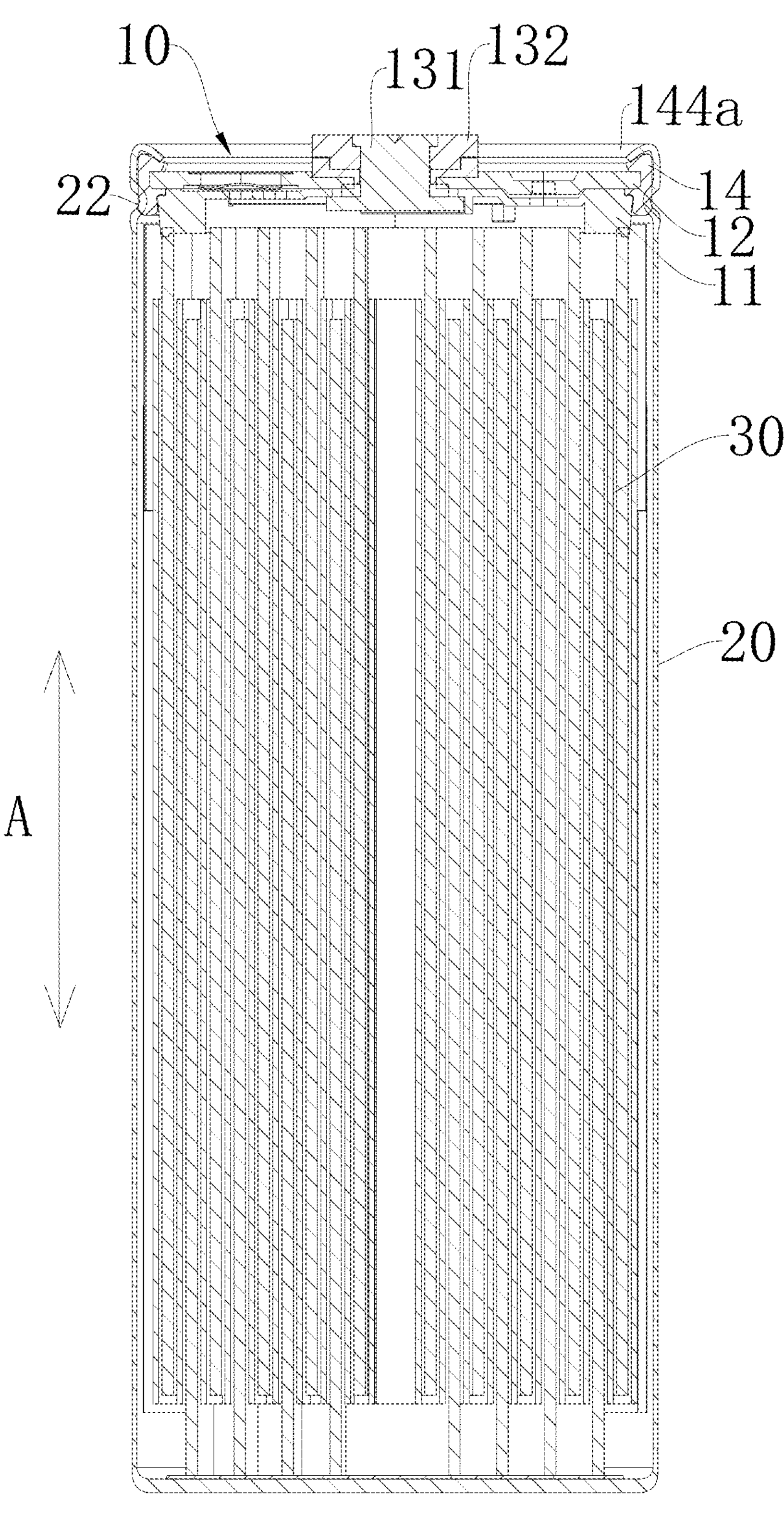
FIG. 5 is a sectional view showing a cell according to an embodiment of the present disclosure.

In some embodiments, as illustrated in FIG. 5, the metallic support plate 12 and the insulation cover plate 11 are stacked in a thickness direction (e.g., a predetermined direction A illustrated in FIG. 5). The terminal assembly 13 passes through the insulation cover plate 11 and the metallic support plate 12 in the thickness direction to connect the insulation cover plate 11 and the metallic support plate 12. The elastic seal 14 surrounds a peripheral outside of the metallic support plate 12 and the insulation cover plate 11. Further, the elastic seal 14 has a positioning flange 141 provided on an inner peripheral surface thereof and is configured to be in a sealing fit with the housing 20 of the cell 100. The positioning flange 141 is sandwiched between the metallic support plate 12 and the insulation cover plate 11.

Figure 2:
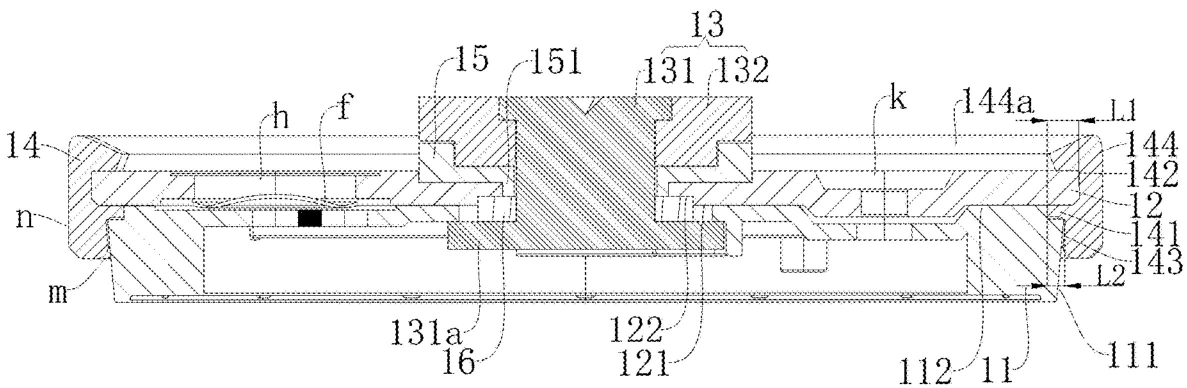
FIG. 2 is a schematic sectional view showing a top cover assembly according to an embodiment of the present disclosure.

As illustrated in FIG. 1 and FIG. 2, the elastic seal 14 is disposed in a circumferential direction of the top cover assembly 10. The elastic seal 14 has a ring-shaped positioning flange 141 provided on a side thereof facing towards the terminal assembly 13. An end surface of the insulation cover plate 11 in a circumferential direction thereof has a slot defined therein. The slot is mated with the positioning flange 141. The positioning flange 141 can be inserted into the slot and support the metallic support plate 12.

With the top cover assembly 10 according to embodiments in the present disclosure, the metallic support plate 12 is in contact with the insulation cover plate 11 in the thickness direction to shorten a length of the top cover assembly 10 in the thickness direction and enlarge a space between the top cover assembly 10 and the housing 20, thereby increasing a capacity of the cell 100. In addition, the positioning flange 141 can support the metallic support plate 12, limit a position of the insulation cover plate 11 in the thickness direction, and improve sealing performance of the top cover assembly 10. In this way, it is possible to prevent normal use of the top cover assembly 10 from being affected due to an elastic deformation caused by mutual compression between the insulation cover plate 11 and the metallic support plate.

In an embodiment, as illustrated in FIG. 2, the elastic seal 14 may have a sleeve-like shape, and include a first sealing sleeve 142 and a second sealing sleeve 143 that are disposed at both sides of the positioning flange 141, respectively. The metallic support plate 12 is located within a space defined by the first sealing sleeve 142 and the positioning flange 141. The insulation cover plate 11 is located within a space defined by the second sealing sleeve 143 and the positioning flange 141. The first sealing sleeve 142 has an inner peripheral surface located outside of an inner peripheral surface of the second sealing sleeve 143.

The positioning flange 141 can divide the elastic seal 14 into the first sealing sleeve 142 and the second sealing sleeve 143. The first sealing sleeve 142 is mated with the metallic support plate 12 in a circumferential direction of the metallic support plate 12. The second sealing sleeve 143 is mated with the insulation cover plate 11 in a circumferential direction of the insulation cover plate 11. The first sealing sleeve 142 has a depth L1 in a radial direction of the metallic support plate 12, and the second sealing sleeve 143 has a depth L2 in a radial direction of the insulation cover plate 11, where L1>L2.

In this manner, a space defined by the first sealing sleeve 142, the second sealing sleeve 143, and the positioning flange 141 can facilitate mounting of the metallic support plate 12, the insulation cover plate 11, and the elastic seal 14. In addition, since the depth of the first sealing sleeve 142 is different from that of the second sealing sleeve 143, it is possible to increase support stability of the metallic support plate 12 by the positioning flange 141 and improve sealing performance of the top cover assembly 10.

In some embodiments, as illustrated in FIG. 2, the second sealing sleeve 143 is formed as a pre-pressed region n configured to withstand a force from a protrusion structure on a side wall of the housing 20 of the cell 100. After the top cover assembly 10 is mounted to the housing 20, the protrusion structure protrudes from the housing 20 of the cell 100 towards the terminal assembly 13 in the radial direction of the metallic support plate 12. The protrusion structure on the side wall of the housing 20 is capable of press the pre-pressed region n on the second sealing sleeve 143. The pre-pressed region n may be formed on the second sealing sleeve 143, or the second sealing sleeve 143 may be the pre-pressed region n.

Therefore, the second sealing sleeve 143 may be formed as the pre-pressed region n to facilitate pressing the pre-pressed region n by the protrusion structure on the housing 20, thereby increasing fitting tightness between the top cover assembly 10 and the housing 20 as well as sealing performance of the cell 100.

Further, the inner peripheral surface of the first sealing sleeve 142 is adapted to the metallic support plate 12. A reserved gap m is formed between the inner peripheral surface of the second sealing sleeve 143 and an outer peripheral surface of the insulation cover plate 11.

As illustrated in FIG. 2, the outer peripheral surface of the insulation cover plate 11 is gradually away from the housing 20 from a top to a bottom of the cell 100 in the predetermined direction A. A predetermined included angle is formed between the outer peripheral surface of the insulation cover plate 11 and the elastic seal 14 to allow a space to be formed between the insulation cover plate 11 and the second sealing sleeve 143.

Therefore, by forming the reserved gap m between the second sealing sleeve 143 and the insulation cover plate 11, it is possible to facilitate a deformation of the elastic seal 14 when pressed by the protrusion structure, and mitigate an influence on insulation performance of the insulation cover plate 11 due to the pressing of the elastic seal 14 against the insulation cover plate 11. In this manner, the pressed elastic cover plate is tightly attached with the outer peripheral surface of the insulation cover plate 11.

As illustrated in FIG. 2, the outer peripheral surface of the insulation cover plate 11 has an inwardly inclined surface 111. The inwardly inclined surface 111 is gradually inclined away from the elastic seal 14 in an axial direction away from the metallic support plate. The inwardly inclined surface 111 is gradually inclined away from the elastic seal 14 from a side of the insulation cover plate 11 close to the metallic support plate 12 to a side of the insulation cover plate 11 away from the metallic support plate 12.

Therefore, the inwardly inclined surface 111 of the outer peripheral surface of the insulation cover plate 11 can allow a gap to be formed between the insulation cover plate 11 and the elastic seal 14, thereby lowering a difficulty of compression and deformation of the elastic seal 14 by the protrusion structure when the top cover assembly 10 is fitted with the housing 20.

In some embodiments, the second sealing sleeve 143 has a wall thickness equal to 1.2 times to 2 times a wall thickness of the first sealing sleeve 142. Therefore, the wall thickness of the second sealing sleeve 143 is greater than that of the first sealing sleeve 142. Such an arrangement facilitates intensifying an elastic deformation of the second sealing sleeve 143 to reduce an excessive pressing of the second sealing ring sleeve against the insulation cover plate 11 when the second sealing sleeve 143 is pressed by the housing. Meanwhile, it is possible to avoid a damage to a structure of the top cover assembly 10 while improving the sealing performance of the top cover assembly 10. For example, the wall thickness of the second sealing sleeve body 143 is equal to 1.5 times the wall thickness of the first sealing sleeve body 142.

In an embodiment illustrated in FIG. 2, the terminal assembly 13 includes a terminal 131 and a terminal fixation member 132. The terminal 131 passes through the insulation cover plate 11 and the metallic support plate 12. The terminal fixation member 132 is connected to the terminal 131 at a side of the metallic support plate 12 away from the insulation cover plate 11. The top cover assembly 10 also includes an insulation gasket 15 interposed between the terminal fixation member 132 and one surface of the metallic support plate 12.

The terminal 131 can pass through the terminal fixation member 132, the metallic support plate 12, and the insulation cover plate 11. Here, the terminal fixation member 132 is located at a side of the metallic support plate 12 away from the insulation cover plate 11. An outer wall of the terminal fixation member 132 at a side close to metallic support plate 12 has a slot arranged circumferentially. The insulation gasket 15 is disposed between the terminal fixation member 132 and the metallic support plate 12. The insulation gasket 15 also has a ring-shaped partition plate provided in a circumferential direction of the terminal fixation member 132. The ring-shaped partition plate is fitted with to the slot on the terminal fixation member 132.

Therefore, by arranging the insulation gasket 15 between the terminal fixation member 132 and the metallic support plate 12, it is possible to avoid possible electric leakage and a short circuit of the top cover assembly 10 due to a direct contact between the metallic support plate 12 and the terminal fixation member 132, thereby improving use safety of the top cover assembly 10.

Further, as illustrated in FIG. 2, the insulation gasket 15 has an insertion protrusion 151 sandwiched between an outer peripheral surface of the terminal 131 and a through hole of the metallic support plate 12. The insertion protrusion 151 has a ring-shaped cross section. The ring-shaped insertion protrusion 151 may allow the terminal 131 to pass therethrough.

Therefore, by providing the insertion protrusion 151 between the terminal 131 and the metallic support plate 12, it is possible to avoid the direct contact between the terminal 131 and the metallic support plate 12, thereby reducing the possibility of the short circuit of the top cover assembly 10.

In an embodiment, the top cover assembly 10 of the cell 100 also includes an insulation pad 16 disposed around the terminal 131. The terminal 131 includes a stop flange **131*a* abutting against the insulation cover plate 11. The insulation pad 16 is pressed between the other surface of the metallic support plate 12 and the stop flange 131*a* of the terminal 131**.

As illustrated in FIG. 2, the insulation pad 16 and the terminal 131 are integrally formed. The insulation pad 16 may be disposed at an end of the terminal 131 close to the insulation cover plate 11. The stop flange **131*a* abuts against a side of the insulation cover plate 11 away from the metallic support plate 12. A ring-shaped insulation pad 16 is disposed between the stop flange 131*a* and the metallic support plate 12**.

Therefore, by disposing the insulation pad 16 around the terminal 131, it is possible to avoid a short circuit due to a contact between the metallic support plate 12 and the stop flange **131*a* of the terminal 131. In addition, the stop flange 131*a* can increase firmness of the terminal 131 to the mounting of the terminal 131 and the insulation cover plate 11, the metallic support plate 12, and the terminal fixation member 132**.

In the embodiment illustrated in FIG. 2, the other surface of the metallic support plate 12 has a first recess 121 and a second recess 122 located at a bottom of the first recess 121. The insulation cover plate 11 has a boss 112 inserted into the first recess 121. A portion of the insulation pad 16 protruding beyond the boss 112 is fitted with the second recess 122.

The first recess 121 is defined at a side of the metallic support plate 12 adjacent to the insulation cover plate 11. The first recess 121 has an inner diameter greater than an outer diameter of the stop flange **131*a*. The second recess 122 is located on a bottom wall of the first recess 121, and has an inner diameter smaller than that of the first recess 121. The first recess 121 is mounted to and fitted with the insulation cover plate 11. The second recess 122 is mounted to and fitted with the insulation pad 16**.

Therefore, by the first recess 121 and the second recess 122 defined in the metallic support plate 12 as well as the boss 112 fitted with the first recess 121, the boss 112 can be easily fitted with the metallic support plate 12 and the insulation cover plate 11, thereby increasing mounting efficiency between the insulation cover plate 11 and the metallic support plate 12.

In some embodiments, as illustrated in FIG. 2, the metallic support plate 12 has a liquid injection hole k corresponding to a liquid injection hole k of the insulation cover plate 11. The insulation cover plate 11 has a through hole h in communication with a through hole h of the metallic support plate 12. An explosion-proof valve f for closing the through hole h of the metallic support plate 12 is disposed within the through hole h.

Therefore, by defining the through hole h and the liquid injection hole k on each of the metallic support plate 12 and the insulation cover plate 11, it is possible to facilitate an injection of an electrolyte into the housing 20 after the top cover assembly 10 is assembled to the housing 20. Also, mounting the explosion-proof valve f within the through hole h can allow a pressure inside the cell 100 to be relieved by the explosion-proof valve f mounted within the through hole h when the cell 100 is damaged to explode, thereby increasing use safety of the cell 100.

A cell 100 according to embodiments of the present disclosure includes a housing 20, a jelly roll 30, and the top cover assembly 10 according to any of the embodiments as described above. The housing 20 is open at one end thereof to form an assembling port 21. The jelly roll 30 is disposed within the housing 20. The top cover assembly 10 is mounted at the assembling port 21 of the housing 20. A side wall of the housing 20 has a protrusion structure 22 protruding inwardly and configured to press an outer peripheral surface of the elastic seal 14 in a radial direction. The elastic seal 14 has a protrusion 144 protruding beyond the metallic support plate 12. A top of the housing 20 abuts against the protrusion 144 of the elastic sealing member 14.

As illustrated in FIG. 1 to FIG. 5, the assembling port 21 is defined at one end of the housing 20. The protrusion structure 22 protruding inwardly is formed at a position close to the assembling port 21. The protrusion structure 22 is formed on the side wall of the housing 20. The jelly roll 30 is assembled within the housing 20. The top cover assembly 10 is mounted to the housing 20 through the assembling port 21 of the housing 20 to seal the housing 20. In an embodiment, the protrusion structure 22 is capable of press a side wall of the elastic seal 14 assembled to the protrusion structure 22 to deform a part of the elastic seal 14 opposite to the protrusion structure 22. In this manner, the elastic seal 14 can be attached to the insulation cover plate 11. The protrusion structure 22 may be formed through a roller pressing process. The protrusion 144 is a part of the side wall of the elastic seal 14, and protrudes beyond the metallic support plate 12 in an axial direction of the terminal 131 to be connected to the housing 20. The positioning flange 141 is therefore disposed at a side of the housing 20 close to the jelly roll 30. The positioning flange 141 is located between the insulation cover plate 11 and the metallic support plate 12, and can be adapted to the side wall of the insulation cover plate 11 and support the metallic support plate 12.

Therefore, with the protrusion structure 22 formed on the side wall of the housing 20 and the protrusion 144 disposed on the elastic seal 14, an inward pressing force can be generated after the housing 20 is assembled to the top cover assembly 10, thereby increasing mounting stability of the top cover assembly 10. In addition, the protrusion 144 can increase a contact area between the top cover assembly 10 and an inner wall of the housing 20, thereby improving sealing performance inside of the cell 100 and reinforcing a connection between the top cover assembly 10 and the housing 20.

In an embodiment, as illustrated in FIG. 5, the protrusion 144 has a folded edge **144*a*. The folded edge 144*a* is configured to press and wrap the protrusion 144, and the protrusion 144 is partially pressed against an end surface of the metallic support plate 12. That is, a top end of the protrusion 144 of the elastic seal 14 also has a folded edge 144***a* provided thereon. The folded edge 144*a* may extend on the elastic seal 14 along the ring-shaped protrusion 144. In the axial direction of the terminal 131, one end of the folded edge 144*a* may be connected to the elastic seal 14, and the other end may be bent from a top to a bottom of the top cover assembly 10 and abutting against the metallic support plate 12.

Therefore, by forming the folded edge 144*a* on the protrusion 144, it is possible to allow the folded edge 144*a* to press and wrap the protrusion 144 and to abut against the end surface of the metallic support plate 12. In this manner, sealing of the elastic seal 14 against the metallic support plate 12 and the insulation cover plate 11 can be unproved, thereby increasing structural strength of the top cover assembly 10.

A power battery according to embodiments of the present disclosure includes a plurality of cell 100, each of which is the cell 100 according to any of the embodiments as described above. The plurality of cells 100 is electrically connected to each other to form a charge-discharge circuit. Therefore, the plurality of cells 100 is electrically connected to each other, thereby facilitating an increase in a capacity of the power battery and an improvement of a charge-discharge capability of the power battery.

In the description of the present disclosure, it should be understood that the orientation or position relationship indicated by the terms "center," "length," "width," "thickness," "upper," "lower," "front," "rear," "left," "right," "vertical," "horizontal," "top," "bottom," "inner," "outer," "axial," "radial," and "circumferential," etc. is based on the orientation or position relationship shown in the drawings, and is merely for the convenience of describing the present disclosure and simplifying the description, rather than indicating or implying that the associated device or element must have a specific orientation, or be constructed and operated in a specific orientation, and therefore cannot be understood as a limitation on the present disclosure.

In addition, the terms "first feature" and "second feature" may include one or more such feature. In the description of the present disclosure, "a plurality of" means two or more. In the description of the present disclosure, the first feature "on" or "under" the second feature may mean that the first feature is in direct contact with the second feature, or the first and second features are in indirect contact through an intermediate. In the description of the present disclosure, the first feature "above", "on" and "over" the second feature may mean that the first feature is directly above or obliquely above the second feature, or simply mean that the level of the first feature is higher than that of the second feature.

In the description of this specification, descriptions with reference to the terms "an embodiment," "some embodiments," "illustrative embodiments," "examples," "specific examples," or "some examples" etc., mean that specific features, structure, materials or characteristics described in conjunction with the embodiment or example are included in at least one embodiment or example of the present disclosure. In this specification, the schematic representations of the above terms do not necessarily refer to the same embodiment or example.

Although the embodiments of the present disclosure have been shown and described, it should be appreciated by those of ordinary skill in the art that various changes, modifications, replacements, and variations may be made to these embodiments without departing from principles and spirit of the present disclosure. The scope of the present disclosure is defined by the appended claims and their equivalents.

What is claimed is:

1. A top cover assembly of a cell, the top cover assembly comprising:

an insulation cover plate;

a metallic support plate, the metallic support plate and the insulation cover plate being stacked in a thickness direction;

a terminal assembly passing through the insulation cover plate and the metallic support plate in the thickness direction to connect the insulation cover plate and the metallic support plate; and an elastic seal being disposed in a circumferential direction of the top cover assembly, having a sleeve-like shape, and surrounding a peripheral outside of the metallic support plate and a peripheral outside of the insulation cover plate in the circumferential direction, wherein the elastic seal has a positioning flange provided on an inner peripheral surface thereof, wherein the positioning flange is sandwiched between the metallic support plate and the insulation cover plate, and wherein the elastic seal is configured to be in a sealing fit with a housing of the cell, wherein in a direction perpendicular to the thickness direction, an outer peripheral surface of the insulation cover plate is located at a side of the insulation cover plate that faces away from the terminal assembly, the outer peripheral surface of the insulation cover plate extends along the circumferential direction of the top cover assembly, and has a slot mated with the positioning flange, an end of the positioning flange extending towards the terminal assembly is inserted into the slot, and the positioning flange supports the metallic support plate in a direction toward a top of the cell.

2. The top cover assembly of the cell according to claim 1, wherein the elastic seal comprises a first sealing sleeve and a second sealing sleeve that are disposed at two sides of the positioning flange, respectively, the first sealing sleeve having an inner peripheral surface located outside of an inner peripheral surface of the second sealing sleeve, wherein the metallic support plate is located within a space defined by the first sealing sleeve and the positioning flange, and wherein the insulation cover plate is located within a space defined by the second sealing sleeve and the positioning flange.

3. The top cover assembly of the cell according to claim 2, wherein the second sealing sleeve is formed as a prepressed region configured to withstand a force from a protrusion structure on a side wall of the housing of the cell.

4. The top cover assembly of the cell according to claim 3, wherein the inner peripheral surface of the first sealing sleeve is adapted to the metallic support plate, and wherein a reserved gap is defined between the inner peripheral surface of the second sealing sleeve and an outer peripheral surface of the insulation cover plate.

5. The top cover assembly of the cell according to claim 4, wherein the outer peripheral surface of the insulation cover plate is gradually inwardly inclined away from the elastic seal in an axial direction away from the metallic support plate.

6. The top cover assembly of the cell according to claim 2, wherein the second sealing sleeve has a wall thickness equal to 1.2 times to 2 times a wall thickness of the first sealing sleeve.

7. The top cover assembly of the cell according to claim 1, wherein the terminal assembly comprises:

a terminal passing through the insulation cover plate and the metallic support plate; and a terminal fixation member connected to the terminal at a side of the metallic support plate away from the insulation cover plate; and wherein the top cover assembly further comprises an insulation gasket interposed between the terminal fixation member and one surface of the metallic support plate.

8. The top cover assembly of the cell according to claim 7, wherein the insulation gasket comprises an insertion protrusion sandwiched between an outer peripheral surface of the terminal and a through hole of the metallic support plate.

9. The top cover assembly of the cell according to claim 7, further comprising an insulation pad disposed around the terminal, wherein the terminal has a stop flange abutting against the insulation cover plate, and wherein the insulation pad is pressed between another surface of the metallic support plate and the stop flange of the terminal.

10. The top cover assembly of the cell according to claim 9, wherein the other surface of the metallic support plate has a first recess and a second recess located at a bottom of the first recess, wherein the insulation cover plate has a boss inserted into the first recess, and wherein a part of the insulation pad protruding beyond the boss is adapted to the second recess.

11. The top cover assembly of the cell according to claim 1, wherein the metallic support plate has a liquid injection hole corresponding to a liquid injection hole of the insulation cover plate; and wherein the insulation cover plate has a through hole in communication with a through hole of the metallic support plate, and wherein an explosion-proof valve for closing the through hole of the metallic support plate is disposed at the through hole of the metallic support plate.

12. A cell, comprising:

a housing, the housing being open at one end thereof to define an assembling port;

a jelly roll disposed within the housing; and the top cover assembly according to claim 1, wherein the top cover assembly is mounted at the assembling port of the housing, wherein a side wall of the housing has a protrusion structure protruding inwardly and configured to press an outer peripheral surface of the elastic seal in a radial direction, wherein the elastic seal has a protrusion protruding beyond the metallic support plate, and wherein a top of the housing abuts against the protrusion of the elastic seal.

13. The cell according to claim 12, wherein the top of the housing has a folded edge, the folded edge being configured to press and wrap the protrusion, and the protrusion being partially pressed against an end surface of the metallic support plate.

14. A power battery, comprising:

a plurality of cells, each of the plurality of cells being the cell according to claim 12, wherein the plurality of cells are electrically connected to each other to form a charge-discharge circuit.

* * * * *